United States Patent Office 3,480,695
Patented Nov. 25, 1969

3,480,695
POLYHYDROXYETHER COMPOSITIONS
CONTAINING POLYCARBONATES
Warren F. Hale, Somerville, N.J., assignor to Union
Carbide Corporation, a corporation of New York
No Drawing. Filed Dec. 14, 1965, Ser. No. 513,852
Int. Cl. C08g 43/02
U.S. Cl. 260—860       16 Claims

ABSTRACT OF THE DISCLOSURE

Polyblends of thermoplastic polyhydroxyethers and polycarbonates having from about 5 to 50 parts of polycarbonate per 100 parts of polyhydroxyether are characterized by improved properties.

---

This invention relates to thermoplastic polyhydroxyether compositions having improved thermal properties.

Although thermoplastic polyhydroxyethers having the general formula:

$$\text{\{D—O—E—O\}}_n$$

wherein D is the radical residuum of a dihydric phenol, E is the radical residuum of an epoxide and $n$ represents the degree of polymerization and is at least 30 and preferably 40 to 80 or more, exhibit a number of useful physical and chemical properties, their glass transition temperatures and heat distortion temperatures in most instances limit them to applications where the temperature does not approach that of boiling water. Thus, for example, a thermoplastic polyhydroxyether, wherein D in the above formula is derived from bisphenol-A, 2,2-bis(4-hydroxyphenyl)propane, and epichlorohydrin, has a glass transition temperature of 95° C., and a heat distortion temperature of 91° C. at 66 p.s.i. and 87° C. at 264 p.s.i.

It has now been found that these properties can be enhanced by blending 100 parts of thermoplastic polyhydroxyethers having the general formula:

$$\text{\{D—O—E—O\}}_n$$

wherein D, E and $n$ are as defined above with from about 5 to 50 parts of a polycarbonate having the general formula:

$$\left[ -Q-T-Q-O-\overset{O}{\underset{\|}{C}}-O- \right]_x$$

wherein Q represents an aromatic diradical having up to about 10 carbon atoms, T is a divalent hydrocarbon radical having up to 8 carbon atoms and $x$ denotes the degree of polymerization which is sufficiently high so as to afford a normally solid polymer.

The blending of a thermoplastic polyhydroxyether with a polycarbonate provides a mixture or polyblend exhibiting the attributes of the thermoplastic polyhydroxyether in an extended temperature range.

The term "thermoplastic polyhydroxyether" herein refers to substantially linear polymers having the formula:

$$\text{\{D—O—E—O\}}_n$$

wherein D, E and $n$ are as defined above. The term "thermoplastic polyhydroxyether" is intended to include mixtures of at least two thermoplastic polyhydroxyethers.

The thermoplastic polyhydroxyethers can be prepared by admixing from about 0.985 to about 1.015 moles of an epihalohydrin with one mole of a dihydric phenol together with from about 0.6 to 1.5 moles of an alkali metal hydroxide, such as, sodium hydroxide or potassium hydroxide generally in an aqueous medium at a temperature of about 10° to about 50° C. until at least about 60 mole percent of the epihalohydrin has been consumed.

The thermoplastic polyhydroxyethers thus produced have reduced viscosities of at least 0.43, generally from 0.43 to about 1 and preferably from about 0.5 to 0.7. Reduced viscosity values were computed at 25° C.

The dihydric phenol contributing the phenol radical residuum D, can be either a dihydric mononuclear phenol such as those having the general formula:

$$\text{HO—}\overset{(Y)_r}{\underset{|}{Ar}}\text{—R}^1\text{—}\overset{(Y_1)_z}{\underset{|}{Ar}}\text{—OH}$$

wherein Ar is an aromatic divalent hydrocarbon such as naphthalene and, preferably, phenylene, Y and $Y_1$ which can be the same or different are alkyl radicals, preferably having from 1 to 4 carbon atoms, halogen atoms, i.e., fluorine, chlorine, bromine and iodine, or alkoxy radicals, preferably having from 1 to 4 carbon atoms, $r$ and $z$ are integers having a value from 0 to a maximum value corresponding to the number of hydrogen atoms on the aromatic radical (Ar) which can be replaced by substituents and $R^1$ is a bond between adjacent carbon atoms as in dihydroxydiphenyl or a divalent radical including, for example, $$-\underset{\underset{O}{\|}}{C}-, \quad -O-, \quad -S-, \quad -SO-, \quad -SO_2- \text{ and } -S-S-$$

and divalent hydrocarbon radicals such as alkylene, alkylidene, cycloaliphatic, e.g., cycloalkylene and cycloalkylidene, halogenated alkoxy or aryloxy substituted alkylene, alkylidene and cycloaliphatic radicals as well as alkarylene and aromatic radicals including halogenated, alkyl, alkoxy or aryloxy substituted aromatic radicals and a ring fused to an Ar group; or $R^1$ can be polyalkoxy, or polysiloxy, or two or more alkylidene radicals separated by an aromatic ring, a tertiary amino group, an ether linkage, a carbonyl group or a sulfur containing group such as sulfoxide, and the like.

Examples of specific dihydric polynuclear phenols include among others:

The bis(hydroxyphenyl)alkanes such as 2,2-bis(4-hydroxyphenyl)propane,
2,4'-dihydroxydiphenylmethane,
bis(2-hydroxyphenyl)methane,
bis(4-hydroxyphenyl)methane,
bis(4-hydroxy-2,6-dimethyl-3-methoxyphenyl)methane,
1,1-bis(4-hydroxyphenyl)ethane,
1,2-bis(4-hydroxyphenyl)ethane,
1,1-bis(4-hydroxy-2-chlorophenyl)ethane,
1,1-bis(3-methyl-4-hydroxyphenyl)ethane,
1,3-bis(3-methyl-4-hydroxyphenyl)propane,
2,2-bis(3-phenyl-4-hydroxyphenyl)propane,
2,2-bis(3-isopropyl-4-hydroxyphenyl)propane,
2,2-bis(2-isopropyl-4-hydroxyphenyl)propane,
2,2-bis(4-hydroxynaphthyl)propane,
2,2-bis(4-hydroxyphenyl)pentane,
3,3-bis(4-hydroxyphenyl)pentane,
2,2-bis(4-hydroxyphenyl)heptane,
bis(4-hydroxyphenyl)phenylmethane,
bis(4-hydroxyphenyl)cyclohexylmethane,
1,2-bis(4-hydroxyphenyl-1,2-bis(phenyl)propane,
2,2-bis(4-hydroxyphenyl)-1-phenyl-propane and the like;

Di(hydroxyphenyl)sulfones such as bis(4 - hydroxyphenyl)sulfone, 2,4'-dihydroxydiphenyl sulfone, 5'-chloro-2,4'-dihydroxydiphenyl sulfone, 5'-chloro - 4,4' - dihydroxydiphenyl sulfone and the like;

Di(hydroxyphenyl)ethers such as bis(4-hydroxyphenyl)ether,
the 4,3'-, 4,2'-, 2,2'-, 2,3'-dihydroxydiphenyl ethers,
4,4'-dihydroxy-2,6-dimethyldiphenyl ether,
bis(4-hydroxy-3-isobutylphenyl)ether,
bis(4-hydroxy-3-isopropylphenyl)ether,
bis(4-hydroxy-3-chlorophenyl)ether, bis(4-hydroxy-3-fluorophenyl)ether,
bis(4-hydroxy-3-bromophenyl)ether,
bis(4-hydroxynaphthyl)ether,
bis(4-hydroxy-3-chloronaphthyl)ether,
bis(2-hydroxydiphenyl)ether,
4,4'-dihydroxy-2,6-dimethoxydiphenyl ether,
4,4'-dihydroxy-2,5-diethoxydiphenyl ether, and the like.

Also suitable are the bisphenol reaction products of 4-vinylcyclohexene and phenols e.g., 1,3-bis(p-hydroxyphenyl)-1-ethylcyclohexane, and the bisphenol reaction products of dipentene or its isomers and phenols such as 1,2-bis(p-hydroxyphenyl)-1-methyl-4 - isopropylcyclohexane as well as bisphenols such as 1,3,3-trimethyl-1-(4-hydroxyphenyl)-6-hydroxyindane, and 2,4 - bis(4 - hydroxyphenyl)-4-methylpentane, and the like.

Particularly desirable dihydric polynuclear phenols have the formula:

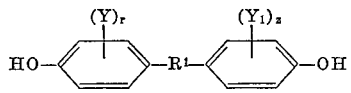

wherein Y and $Y_1$ are as previously defined, $r$ and $z$ have values from 0 to 4 inclusive and $R^1$ is a divalent saturated aliphatic hydrocarbon radical, particularly alkylene and alkylidene radicals having from 1 to 3 carbon atoms, and cycloalkylene radicals having up to and including 10 carbon atoms.

Mixtures of dihydric phenols can also be employed and whenever the term "dihydric phenol" or "dihydric polynuclear phenol" is used herein, mixtures of these compounds are intended to be included.

The epoxide contributing the hydroxyl containing radical residuum, E, can be a monoepoxide or diepoxide. By "epoxide" is meant a compound containing an oxirane group, i.e., oxygen bonded to two vicinal aliphatic carbon atoms, thus

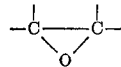

A monoepoxide contains one such oxirane group and provides a radical residuum E containing a single hydroxyl group, a diepoxide contains two such oxirane groups and provides a radical residuum E containing two hydroxyl groups. Saturated epoxides, by which term is meant diepoxides free of ethylenic unsaturation, i.e., $>C=<$ and acetylenic unsaturation, i.e., $-C\equiv C-$, are preferred. Particularly preferred are halogen substituted saturated monoepoxides, i.e., the epihalohydrins and saturated diepoxides which contain solely carbon, hydrogen and oxygen, especially those wherein the vicinal or adjacent carbon atoms form a part of an aliphatic hydrocarbon chain. Oxygen in such diepoxides can be, in addition to oxirane oxygen, ether oxygen $-O-$,

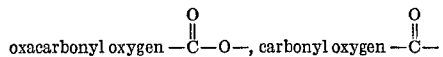

and the like.

Specific examples of monoepoxides include epichlorohydrins such as epichlorohydrin, epibromohydrin, 1,2-epoxy-1-methyl-3-chloropropane, 1,2-epoxy - 1 - butyl - 3-chloropropane, 1,2-epoxy-2-methyl-3-fluoropropane, and the like.

Illustrative diepoxides include diethylene glycol bis(3,4-epoxycyclohexane-carboxylate),
bis-3,4-epoxycyclohexylmethyl)adipate,
bis(3,4-epoxycyclohexylmethyl)phthalate,
6-methyl-3,4-epoxycyclohexylmethyl-6-methyl-3,4-epoxycyclohexane carboxylate,
2-chloro-3,4-epoxycyclohexylmethyl-2-chloro-3,4-epoxycyclohexane-carboxylate,
diglycidyl ether,
bis(2,3-epoxycyclopentyl)ether,
1,5-pentanediol bis(6-methyl-3,4-epoxycyclohexylmethyl)ether,
bis(2,3-epoxy-2-ethylhexyl)adipate,
diglycidyl maleate,
diglycidyl phthalate,
3-oxatetracyclo[4.4.0]$^{7,10}$.0$^{2,4}$]undec-8-yl 2,3-epoxypropyl ether,
bis(2,3-epoxycyclopentyl)sulfone,
bis(3,4-epoxyhexoxypropyl)sulfone,
2,2'-sulfonyldiethyl bis(2,3-epoxycyclopentanecarboxylate),
3-oxatetracyclo[4.4.0.1$^{7,10}$.0$^{2,4}$]undec-8-yl 2,3-epoxybutyrate,
4-pentenal-di(6-methyl-3,4-epoxycyclohexylmethyl) acetal,
ethylene glycol bis(9,10-epoxystearate),
diglycidyl carbonate,
bis(2,3-epoxybutylphenyl)-2-ethylhexyl phosphate,
diepoxydioxane,
butadienedioxide, and
2,3-dimethyl butadiene dioxide The preferred diepoxides are those wherein each of the oxirane groups is connected to an electron donating substituent which is not immediately connected to the carbon atoms of the oxirane group. Such diepoxides having the grouping

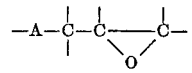

wherein A is an electron donating substituent such as

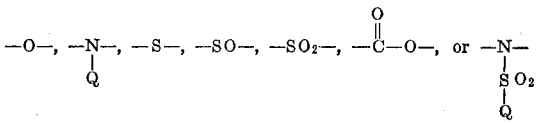

and Q is a saturated hydrocarbon radical such as an alkyl, cycloalkyl, aryl or aralkyl radical.

A single monoepoxide or diepoxide or a mixture of at least two monoepoxides or diepoxides can be employed in preparing thermoplastic polyhydroxyethers and the terms "monoepoxide" and "diepoxide" are intended to include a mixture of at least two monoepoxides or diepoxides, respectively.

Melt flow of each of the thermoplastic polyhydroxyethers was determined by weighing in grams the amount of polyhydroxyether, which, at a temperature of 220° C. and under a pressure of 44 p.s.i., flowed through an orifice having a diameter of 0.0825" and a length of 0.315" over a ten minute period. Four such determinations were made and the average of the four determinations is reported as decigrams per minute under a pressure of 44 p.s.i. and at 220° C.

The thermoplastic polyhydroxyether used in the examples unless otherwise stated was prepared by the reaction of equimolar amounts of 2,2-bis(4-hydroxyphenyl)-propane and epichlorohydrin together with sodium hydroxide. Equipment used was provided with a sealed stirrer, thermometer, and reflux condenser. There was placed therein:

| | Parts |
|---|---|
| 2,2-bis(4-hydroxyphenyl)propane (0.5 mole) | 114.5 |
| Epichlorohydrin (99.1%) pure (0.5 mole) | 46.8 |
| Ethanol | 96.0 |
| Butanol | 10.0 |
| Sodium hydroxide (97.5%) pure | 22.6 |
| Water | 70.0 |

The above mixture was stirred at room temperature for 16 hours to accomplish the initial coupling reaction. The mixture was then heated at 80° C. for an hour. Sixty milliliters of a 7:3 mixture of toluene:butanol was added. Heating of the mixture at 80° C. was continued another two hours. There was added an additional 50 parts of the 7:3 toluene:butanol mixture and 4.5 parts of phenol. The contents of the vessel were continued heated at 80° C. (reflux) for 2½ hours. Upon cooling, the reaction mixture was cut with 200 parts of the 7:3 toluene:butanol mixture. One hundred parts of water was added and agitated with the contents to dissolve salts present in the reaction mixture. The vessel contents were allowed to settle for ten minutes during which time a lower brine phase formed. This lower phase was separated by decantation. The upper polymer solution containing phase was washed successively with two 160 part portions of water containing 4.5% butanol. The washed polymer solution was acidified by stirring the solution with a mixture of 1 part of 85% phosphoric acid with 100 parts of water (pH=2) for one hour. The upper polymer solution phase was again separated by decantation and water washed with four successive 200 part portions of water containing 4.5% butanol. The washed polymer was then coagulated in 1,000 parts of isopropanol, filtered, and dried. There was obtained a thermoplastic polyhydroxyether of 2,2-bis (4-hydroxyphenol) propane and epichlorohydrin having a melt flow of 7.0 decigrams per minute.

Thermoplastic polyhydroxyethers having melt flows between 0.5 and 20 and more particularly 1 to 10 are preferred.

The thermoplastic polyhydroxyethers of the present invention are substantially free of 1,2-epoxy groups as evidenced by the application of the two "epoxide equivalent" analytical tests described in "Epoxy Resins" by H. Lee and K. Neville, pages 21–25, McGraw-Hill Book Co., Inc., N.Y. (1957). In the first test, which involves the reaction of 1,2-epoxy groups with a known amount of hydrochloric acid followed by back-titration of the acid consumed, no hydrochloric acid was consumed. In the second test in which the infrared absorbance at 10.95 and 11.60μ was measured (wave lengths at which 1,2-epoxy groups absorb light) no absorbance was demonstrated by the thermoplastic polyhydroxyethers. Thus, it may be concluded that within the experimental limits of these standard tests no 1,2-epoxy groups are present in these thermoplastic polyhydroxyethers.

The polycarbonates used in this invention having the formula:

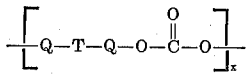

wherein Q, T and $x$ are as defined above, can be prepared by such known methods as the direct phosgenation of, or diaryl carbonate ester interchange with, dihydric polynuclear phenols such as those having the general formula:

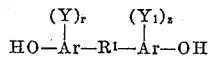

wherein Ar, $R^1$, $(Y)_r$, and $(Y_1)_z$ are as defined above.

Examples of specific dihydric polynuclear phenols include those listed above in the description of the thermoplastic polyhydroxyethers.

It is preferred to employ dihydroxy diphenyl alkanes as the dihydric polynuclear phenols with 2,2-bis(4-hydroxyphenyl)propane, commercially available as bisphenol-A, being particularly preferred. The resultant polycarbonate derived from bisphenol-A will be referred to as bisphenol-A polycarbonate and has the formula:

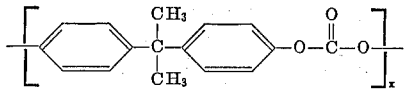

wherein $x$ is at least 30.

The blending of the thermoplastic polyhydroxyethers and polycarbonates can be achieved by any of the plastic blending techniques well known in the art, such as, for example, solutions of the polymers in a common solvent followed by precipitation with a miscible non-solvent, mechanical mixing on a two-roll mill, simultaneous screw extrusion and the like. In the instance where a two-roll mill is employed, it is preferred to flux the polycarbonate on the mill first and then gradually blend the thermoplastic polyhydroxyether in with it. The resulting polymeric mixtures may be handled in any conventional manner employed for the fabrication or manipulation of thermoplastic polymers. The mixtures can be molded using compression, injection, calendering and extrusion techniques. Alternatively, the admixing may be accomplished by mixing solutions of the two polymers which may thereafter be treated with a non-solvent to effect coprecipitation. The precipitated mixture may then be recovered in a dry state after filtration to remove the non-solvent and final evaporation of residual solvent. Dry blending a mixture of the individual polymers followed by thermal fusion is a convenient means for producing a conventional molding compound. In this procedure the dry blend may be extruded and chopped into pellets for subsequent use in injection molding procedures.

The polyhydroxyether-polycarbonate mixtures of this invention may contain other additives to plasticize, extend, lubricate, prevent oxidation or lend color to the mixtures. Such additives are well known in the art and may be incorporated without departing from the scope of the invention.

Because of their excellent physical, mechanical, chemical, electrical, and thermal properties, the mixtures of this invention have many and varied uses. For example, they can be used in molding powder formulations either alone or mixed with various fillers to make molded parts and articles such as gears, ratchets, bearings, cams, impact parts, gaskets, valve seats, bottles, containers and the like. They can be used to prepare molded, calendered or extruded articles, films, coatings, threads, filaments, tapes, and the like. They can be applied to a broad spectrum of uses in form of sheets, rods, tapes and the like and are useful in electrical applications.

Because of the excellent adhesive characteristics of the polyhydroxyether-polycarbonate mixtures of this invention, they can be advantageously employed in one or more decorative, protective, structural or bonding capacities to provide structural elements comprising an adherend and an adherent mixture of polyhydroxyether and polycarbonate as described herein.

The terms "structural element" and "structural elements" as used herein refer to an assembly or assemblies of one or more discrete, planar, curvilinear, rectangular, round or odd shaped objects and a polymeric mixture of this invention. The assembly is characterized by an adhesive bond between a mixture and the object or objects. The terms comprehend, therefore, structural elements comprising an adherend, such as a substrate and an adhering layer of polymeric mixture as in a two-ply laminate or a coated substrate; structural elements comprising an interlayer of polymeric mixture sandwiched between and adhered to two similar or dissimilar adherends or laminate as into a plural ply laminate; structural elements comprising a polymeric mixture matrix surrounding and adhered to as a bond and/or a support for variously shaped and sized adherends such as articles of varying porisities, for example, as the bonding agent and/or substrate in fiber-reinforced plastic articles; structural elements comprising structural members bonded together either closely adjacent or spaced apart by polymeric mixture elements; and combinations of the foregoing. The adherend preferably is readily wettable by the polymeric mixture.

Adherends having a tangible surface or surfaces, preferably a tangible wettable surface or surfaces, to which polyhydroxyether-polycarbonate mixtures readily adhere include metals, polar materials, vitreous materials, proteinaceous materials, cutaneous materials, cellulosic materials, natural resins, synthetic organic polymeric material, nonmetallic materials, and the like. Adherends can be particulate, granular, fibrous, filamentary, ropy, woven, nonwoven, porous, nonporous, rigid, and nonrigid.

Metallic adherends include elementary metals such as aluminum, chromium, cobalt, copper, gold, iron, lead, magnesium, nickel, platinum, silver, tin, titanium, tungsten, vanadium, zinc, and the like, and alloys such as alloy steel, alnico, brass, bronze, carbon, steel, cast iron, chromium steel, nichrome, pewter, solder, stainless steel, sterling silver, and the like. Metallic adherends can be powdered, granular, or in the form of leaf, foil, sheet, bar, rod, and the like.

Polyhydroxyether-polycarbonate mixtures are used to fasten metal articles such as letters and numerals to metallic or ceramic or like substrates, to bond propellers to drive shafts, to fix handles onto metal, especially iron and aluminum pots, and metal doors, to bond bearing surfaces to a strong substrate, to bond a "veneer" of costly metals to less expensive metallic substrates for use as a chemical reactor, and to bond dissimilar metals to form a thermocouple or similar bimetallic element. Laminates of polymeric mixtures and metal foil or sheet can be cold formed into a variety of useful structural elements such as gutters, downspouts, ductwork and the like.

Vitreous adherends include glass, glassware, ceramics, clays, enameled materials, china, porcelain and the like. Cellulosic adherends include wood, plywood, sawdust, cane, bamboo, rattan, paper, and the like.

Natural resin adherends include asphalt, bitumen, gums, lacquer, pitch, rosin, rubber, shellac, tar, varnish and the like. Synthetic organic polymeric adherends include phenolaldehyde type polymers, coumarone indene polymers, phenolurea polymers, epoxy resins and the like, and thermoplastic polymers such as polyolefins, polystyrenes, polyformaldehydes, polyvinyls, synthetic rubber such as neoprene and the like, nylon and the like.

Among nonmetallic adherends can be mentioned dyes such as aniline dyes, azo dyes, mordant dyes, and the like, pigments such as analine black, bone black, ink black, ash, iron grey, cadmium yellow, and the like, minerals such as bauxite, carbon, clay, coal, coke, graphite, gypsum, lime, mica, peat, silica, talc, vermiculite, and the like, rock, stone and gravel such as chalk, lava, limestone, marble, quartz, shale, slate, and the like, building materials such as brick, plaster, tile, wallboard, cement, and the like, fabrics such as broadcloth, burlap, canvas, cotton, Dacron, denin, felt, glass fiber cloth, gunny, linen, nylon, Orlon, rayon, silk, wool, and the like, fibers and filaments such as flax, glass, hemp, jute, manila, oakum, raffia, sisal, and the like, cords such as gut, rope, twine, whipcord, and the like, pelts, furs, hides, leathers and the like.

Adherent polyhydroxyether-polycarbonate mixtures are used to bond glass fibers, woven and non-woven glass fiber cloth, glass fiber mats and bats, into laminated articles having utility as an automotive or building structural elements, into prepreg, post formable laminates which can be formed into useful articles such as automobile fenders and the like, and into filament wound structures such as pipe and high pressure tanks.

In general, it can be stated that what is required to adhere a polyhydroxyether-polycarbonate mixture to an adherend is to flux the mixture at the interface of the two materials. Fluxing is flow under heat and usually pressure, and is easily accomplished by the input of sufficient heat into the area to be bonded. Fluxing can best be accomplished by heating either the substrate and pressing the mixture thereagainst or heating the mixture in some manner, e.g. radiant heating, convection, induction, electrically, ultrasonically, et cetera, and pressing the adherend against the mixture or a heated particulate adherend can be blown against the mixture. It is to be emphasized that actual flow is not necessary, because the polyhydroxyether-polycarbonate mixtures can be "activated" into bonding without flow, as occurs, for example, in some solution coatings. Generally, a short bake at moderate temperatures will improve the bond obtained from solution coatings. The use of pressure assists in obtaining good bonding. Typical of amorphous thermoplastics, polyhydroxyether-polycarbonate mixtures have no distinct melting point or narrow melting range but rather soften over a wide temperature range. At the lower end of the softening range, heat alone may not be sufficient to flux the mixture as it is at the high end of the range, but a combination of mild heat and pressure will cause the mixture to flow.

It is preferred in this invention to fabricate the structural elements comprising a polyhydroxyether-polycarbonate mixture and the adherend at the highest temperature consistent with maintaining the integrity of the polyhydroxyether-polycarbonate mixture and the substrate.

Polyhydroxyether-polycarbonate mixtures can be applied to adherends from solution as by spraying, dipping, brush flow coating, impregnation and the like; by melt application as in extrusion coating, powder coating, flame spraying and fluid bed coating and the like; and, importantly, by film laminating.

The following examples are intended to further illustrate the present invention without limiting the same in any manner. Parts and percentages given are by weight unless indicated otherwise.

In the examples, the following test procedures were used to obtain data:

Tensile properties _____ ASTM D-368-60T.
Flexural properties _____ ASTM D-790-59T.
Pendulum impact strength _____ ASTM D-256-56.
Heat distortion temperature _____ ASTM D-1637-59T.
Melt flow _____ ASTM D-1237-57T.

Glass transition temperature (Tg), commonly referred to as the second order phase transition temperatures, refers to the inflection temperatures found by plotting the resilience (recovery from 1 percent elongation) of a film ranging in thickness from 3–15 mils against the temperature. A detailed explanation for determining resilience and inflection temperature is given by Brown, Textile Research Journal, 25, 891, (1955).

Reduced viscosity (RV) was determined by dissolving a 0.2 gram sample of thermoplastic polycarbonate in chloroform contained in a 100 ml. volumetric flask so that the resultant solution measured exactly 100 ml. at 25° C. in a constant temperature bath. The viscosity of 3 ml. of the solution which had been filtered through a sintered glass funnel was determined in an Ostwald or similar type viscometer at 25° C. Reduced viscosity values were obtained from the equation:

$$\text{Reduced viscosity} = \frac{t_s - t_0}{c \cdot t_0}$$

wherein:

$t_0$ is the efflux time of the pure solvent
$t_s$ is the efflux time of the polymer solution
c is the concentration of the polymer solution expressed in terms of grams of polymer per 100 ml. of solution.

EXAMPLE 1

A 3-inch by 8-inch, oil-heated, two-roll mill was preheated to 240° C. and 30 g. of bisphenol-A polycarbonate fluxed on the rolls. Themoplastic polyhydroxyether, 70 g., was added, the mixture milled for 20 minutes and the blend removed and cooled. A slightly hazy film was pressed at 210° C. and 15,000 p.s.i. The blend was found to be completely soluble in chloroform at room temperature. The following properties were obtained from a sample of the film:

Tg 100° C., $T_4^{(a)}$ 140° C., $T_3^{(b)}$ 155° C., flexural modulus 335,000 p.s.i., tensile strength 8,000 p.s.i., elongation 35–60% and pendulum impact 100 ft. lbs./in.³

EXAMPLE 2

A mixture of 2.0 lbs. of bisphenol-A polycarbonate pellets and 4.67 lbs. of thermoplastic polyhydroxyether pellets was mechanically rotated in a fibre-pak. The mixed pellets were vacuum dried at 60° C. over night and then extruded through a one-inch melt extruder at 560° F. (293° C.). The chopped strand was redried at 60° C. under vacuum and extruded again under the same conditions. Films from the pelletized blend gave the following properties: Tg 95° C., $T_4$ 94° C., $T_3$ 122° C., flexural modulus 300,000 p.s.i., tensile strength 8,500 p.s.i., elongation 50% and pendulum impact 220 lbs./in.³

EXAMPLE 3

Injection molding was carried out on the samples which were prepared by extrusion blending. A Van Dorn injection molding machine was utilized at the following conditions: front of cylinder at 500° F., rear of cylinder at 480° F., 50 second cycle and 13,500–15,600 lbs. pressure. The blends were dried at 65° C. for 48 hours before molding.

In order to obtain some measure of the effect of a blend in a practical application, small cups were injection molded from the extrusion blend of Example 2 and from unblended thermoplastic polyhydroxyether control. The cups were tested for visual retention of dimensions at elevated temperatures. The thermoplastic polyhydroxyether cup was completely distorted, while the polycarbonate blend was only slightly distorted. The distortions produced by placing the cups upside-down in an air-circulating oven have also been recorded. Visually, the thermoplastic polyhydroxyether sample began to distort at 102° C., and the polycarbonate blend at 125° C.

EXAMPLE 4

Samples of a polyblend of thermoplastic polyhydroxyether and bisphenol-A polycarbonate (70:30) were reinforced with about 50% by weight of continuous strand swirl glass mat (Owens-Corning X-600) and the moduli and flexural strengths of the resultant laminates measured at 70° F., 200° F., and 260° F. against a Control containing only glass reinforced thermoplastic polyhydroxyether. The superiority of the blend over the Control is demonstrated in the table. It should be noted that the thermoplastic polyhydroxyether Control affords moduli at 200° F. and 260° F. too small to measure.

What is claimed is:

1. Polyblend comprising a thermoplastic polyhydroxyether having the general formula:

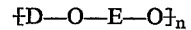

wherein D is the radical residuum of a dihydric phenol, E is the radical residuum of epichlorohydrin, and $n$ represents the degree of polymerization and is at least 30, and from about 5 to 50 parts, per hundred parts of thermoplastic polyhydroxyether of a polycarbonate having the general formula:

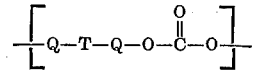

wherein Q represents an aromatic diradical having up to 10 carbon atoms, and T is a divalent hydrocarbon radical having up to 8 carbon atoms.

2. Polyblend claimed in claim 1 wherein D is the radical residuum of a dihydroxy diphenyl alkane and $n$ is at least 40.

3. Polyblend claimed in claim 2 wherein the dihydroxy diphenyl alkane is 2,2-bis(4-hydroxyphenyl)propane.

4. Polyblend claimed in claim 1 wherein Q is a phenylene radical.

5. Polyblend claimed in claim 4 wherein T is an isopropylidene radical.

6. A structural element comprising an adherend and adhering thereto a polyblend comprising a thermoplastic polyhydroxyether having the general formula:

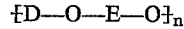

wherein D is the radical residuum of a dihydric phenol, E is the radical residuum of epichlorohydrin, and $n$ represents the degree of polymerization and is at least 30, and from about 5 to 50 parts, per hundred parts of thermoplastic polyhydroxyether of a polycarbonate having the general formula:

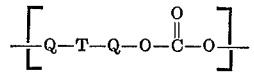

wherein Q represents an aromatic diradical having up to 10 carbon atoms, and T is a divalent hydrocarbon radical having up to 8 carbon atoms.

7. Structural element claimed in claim 6 wherein D is the radical residuum of a dihydroxy diphenyl alkane and $n$ is at least 40.

8. Structural element claimed in claim 7 wherein the dihydroxy diphenyl alkane is 2,2-bis(4-hydroxyphenyl)propane.

TABLE.—PROPERTIES OF GLASS LAMINATES AT VARIOUS TEMPERATURES

| Blend | 70° F. | | 200° F. | | 260° F. | |
|---|---|---|---|---|---|---|
| | Mod.×10⁻⁶ | Flex. Str. | Mod.×10⁻⁶ | Flex. Str. | Mod.×10⁻⁶ | Flex. Str. |
| 100% thermoplastic polyhydroxyether | 1.90 | 51,800 | | 6,900 | | 1,400 |
| 70% thermoplastic polyhydroxyether ¹ 30% bisphenol A polycarbonate ¹ | 1.72 | 43,800 | 0.29 | 4,800 | 0.16 | 3,100 |

¹ Polyblend.

EXAMPLE 5

Laminates of a polyblend of thermoplastic polyhydroxyether and bisphenol-A polycarbonate (70:30) are prepared with steel, copper, aluminum, wood, polyethylene, ethylene copolymers, cured epoxy resins, cured phenolic resins, hemp, jute and asbestos by heating the respective adherends and the polyblend under a pressure of about 10 p.s.i. or more at a temperature of about 400–700° F. until an adhesive bond is formed.

Although the invention has been described in its preferred forms with a certain degree of particularity, it is understood that the present disclosure has been made only by way of example, and that numerous changes can be made without departing from the spirit and scope of the invention.

(a) Temperature at which tensile modulus is 10,000 p.s.i.
(b) Temperature at which tensile modulus is 1,000 p.s.i.

9. Structural element claimed in claim 8 wherein Q is a phenylene radical.

10. Structural element claimed in claim 9 wherein T is an isopropylidene radical.

11. Structural element claimed in claim 6 wherein the adherend is glass.

12. Structural element claimed in claim 6 wherein the adherend is a metal.

13. Structural element claimed in claim 6 wherein the adherend is an organic polymer.

14. Structural element claimed in claim 6 wherein the adherend is a cellulosic material.

15. Structural element claimed in claim 6 wherein the adherend is a fibrous material.

16. A polyblend comprising (A) a thermoplastic polyhydroxyether having the general formula

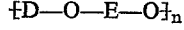

wherein D is the radical residuum of a dihydric phenol, E is the radical residuum of epichlorohydrin, and $n$ represents the degree of polymerization and is within the range of from about 30 to about 80, and (B) a thermoplastic polycarbonate resin, the amount of the polycarbonate resin (B) in the polyblend being within the range of from about 5 to about 33 weight percent of the total amount of (A) and (B).

References Cited

UNITED STATES PATENTS

| 3,225,118 | 12/1965 | De Melio | 260—874 |
| 3,221,080 | 11/1965 | Fox | 260—860 |
| 3,225,118 | 12/1965 | De Melico | 260—874 |
| 3,238,087 | 3/1966 | Norwalk et al. | 161—185 |
| 1,365,639 | 3/1964 | France | 260—860 |

FOREIGN PATENTS

| 1,309,491 | 10/1962 | France. |
| 1,006,776 | 10/1965 | Great Britain. |
| 39/1840 | 2/1964 | Japan. |

MURRAY TILLMAN, Primary Examiner

J. T. GOOLKASIAN, Assistant Examiner

U.S. Cl. X.R.

161—183, 184; 260—47